US 9,854,138 B2

(12) United States Patent
Zilberstein et al.

(10) Patent No.: US 9,854,138 B2
(45) Date of Patent: Dec. 26, 2017

(54) FIXED PATTERN NOISE REDUCTION

(71) Applicant: Gyrus ACMI, Inc., Southborough, MA (US)

(72) Inventors: Chaya Zilberstein, Zichron Yaakov (IL); Nikolay Skarbnik, Yokneam Illit (IL); Stuart Wolf, Yokneam (IL); Natalie Starodubsky, Haifa (IL)

(73) Assignee: GYRUS ACMI, INC., Southborough, MA (US)

( * ) Notice: Subject to any disclaimer, the term of this patent is extended or adjusted under 35 U.S.C. 154(b) by 1232 days.

(21) Appl. No.: 13/623,123

(22) Filed: Sep. 20, 2012

(65) Prior Publication Data

US 2014/0078348 A1   Mar. 20, 2014

(51) Int. Cl.
*H04N 5/217*     (2011.01)
*H04N 5/365*     (2011.01)

(52) U.S. Cl.
CPC .......... *H04N 5/2176* (2013.01); *H04N 5/365* (2013.01); *H04N 5/3651* (2013.01); *H04N 5/3653* (2013.01)

(58) Field of Classification Search
CPC .. H04N 5/2176; H04N 5/3653; H04N 5/3651; H04N 5/365; H04N 5/217
USPC ............ 348/65, 79, 148, 241, 239; 342/372; 375/240.25; 345/419; 382/103
See application file for complete search history.

(56) References Cited

U.S. PATENT DOCUMENTS

| | | | | |
|---|---|---|---|---|
| 4,110,730 A | * | 8/1978 | Varecka | G01V 1/001 340/566 |
| 4,392,157 A | | 7/1983 | Garcia et al. | |
| 5,170,440 A | | 12/1992 | Cox | |
| 5,764,860 A | * | 6/1998 | Yatsuzuka | G06N 3/08 706/25 |
| 5,926,411 A | * | 7/1999 | Russell | G11C 7/005 365/106 |
| 6,529,809 B1 | * | 3/2003 | Breed | G01S 15/04 180/268 |
| 7,224,848 B2 | | 5/2007 | Hofflinger et al. | |

(Continued)

FOREIGN PATENT DOCUMENTS

EP    1206128 A1    5/2002
EP    1401196 A1    3/2004

(Continued)

OTHER PUBLICATIONS

International Application PCT/US13/56700 International Search Report dated Dec. 4, 2013.

(Continued)

*Primary Examiner* — Neil Mikeska
(74) *Attorney, Agent, or Firm* — D. Kligler I.P. Services Ltd.

(57) ABSTRACT

A method, including receiving signals, from a rectangular array of sensor elements arranged in rows and columns, corresponding to an image captured by the array. The method also includes analyzing the signals along a row or a column to identify one or more local turning points, and processing the signals at the identified local turning points to recognize fixed pattern noise in the captured image. The method further includes correcting values of the signals from the sensor elements at the identified local turning points so as to reduce the fixed pattern noise in the image.

21 Claims, 5 Drawing Sheets

(56) References Cited

U.S. PATENT DOCUMENTS

| | | |
|---|---|---|
| 7,268,815 B1 | 9/2007 | Meynants |
| 7,362,911 B1 | 4/2008 | Frank |
| 7,822,287 B2 | 10/2010 | Frank |
| 8,089,533 B2 | 1/2012 | Hara |
| 2001/0052938 A1 | 12/2001 | Itoh |
| 2002/0050518 A1* | 5/2002 | Roustaei ............ G06K 7/10544 235/454 |
| 2003/0048957 A1 | 3/2003 | Dai et al. |
| 2003/0058238 A1* | 3/2003 | Doak et al. .................. 345/419 |
| 2003/0137451 A1* | 7/2003 | Cheng et al. ................ 342/372 |
| 2004/0051795 A1* | 3/2004 | Ajioka ........................ 348/239 |
| 2004/0113052 A1 | 6/2004 | Johanneson et al. |
| 2004/0135895 A1 | 7/2004 | Wiedmann |
| 2005/0146617 A1* | 7/2005 | Hashimoto .......... H04N 5/3575 348/207.99 |
| 2005/0276448 A1* | 12/2005 | Pryor ........................... 382/103 |
| 2006/0226337 A1* | 10/2006 | Lim ........................ G06T 5/002 250/208.1 |
| 2007/0052813 A1* | 3/2007 | Neter .................. H04N 5/3454 348/222.1 |
| 2007/0063997 A1* | 3/2007 | Scherer et al. ............... 345/419 |
| 2007/0069142 A1* | 3/2007 | Moody ............. H01L 27/14609 250/370.09 |
| 2007/0291142 A1 | 12/2007 | Noh et al. |
| 2008/0055446 A1* | 3/2008 | Hunter ............... H04N 5/23245 348/308 |
| 2008/0204211 A1* | 8/2008 | Betz ................. B60R 21/01516 340/438 |
| 2008/0247462 A1* | 10/2008 | Demos ................. H04N 19/597 375/240.03 |
| 2008/0260217 A1* | 10/2008 | Mashiach ............. G06T 7/0085 382/128 |
| 2009/0322911 A1 | 12/2009 | Blanquart |
| 2009/0322912 A1 | 12/2009 | Blanquart |
| 2010/0238330 A1* | 9/2010 | Hirota ............... H01L 27/14621 348/273 |
| 2011/0090240 A1* | 4/2011 | Cohen ...................... G06T 5/20 345/589 |
| 2011/0090371 A1* | 4/2011 | Cote .................... H04N 5/2176 348/237 |
| 2011/0128420 A1 | 6/2011 | Moore |
| 2011/0243409 A1* | 10/2011 | Naimi .................. A61B 5/0064 382/128 |
| 2012/0081385 A1* | 4/2012 | Cote .................. H04N 5/23219 345/589 |
| 2012/0081580 A1* | 4/2012 | Cote ...................... H04N 5/335 348/231.99 |
| 2012/0091340 A1* | 4/2012 | Young ..................... H04N 5/33 250/332 |
| 2012/0113299 A1* | 5/2012 | Palik ........................ G06T 5/50 348/241 |
| 2012/0314776 A1* | 12/2012 | Shimizu et al. ......... 375/240.25 |
| 2013/0044208 A1* | 2/2013 | Cherbis .................. G06K 9/209 348/125 |
| 2014/0073945 A1* | 3/2014 | Rodriguez-Llorente ............. A61B 5/7203 600/476 |

FOREIGN PATENT DOCUMENTS

| | | |
|---|---|---|
| EP | 1605403 A1 | 12/2005 |
| FR | 2953086 A1 | 5/2011 |
| JP | H077675 A1 | 1/1995 |
| JP | 2006339986 A1 | 12/2006 |
| WO | 2009137030 A1 | 11/2009 |
| WO | 2009137037 A1 | 11/2009 |

OTHER PUBLICATIONS

Anaxagoras et al., "APS Column Fixed Pattern Noise Reduction", Workshop on Charge-Coupled Devices, pp. 76-79, Feb. 12, 2008.

Bosco et al., "Texture sensitive denoising for single sensor color imaging devices", Lecture Notes in Computer Science, vol. 5646, pp. 130-139, year 2009.

Delon et al., "Movie and video scale-time equalization application to flicker reduction", IEEE Transactions on Image Processing, vol. 15, No. 1, pp. 241-248, Jan. 2006.

Tendero et al., "Efficient single image non-uniformity correction algorithm", SPIE Proceedings, Electro-Optical and Infrared Systems: Technology and Applications VII, vol. 7834, 12 pages, Oct. 26, 2010.

Hoshino et al., "Noise Reduction in CMOS Image Sensors for High Quality Imaging: The Autocorrelation Function Filter on Burst Image Sequences", ICGST-GVIP Journal, vol. 7, Issue 3, pp. 17-24, Nov. 2007.

Naranjo et al., "Flicker reduction in old films", Proceedings of 2000 International Conference on Image Processing, vol. 2, pp. 657-659, Vancouver, Canada, Sep. 10-13, 2000.

Hewlett-Packard Company, "Noise Sources in CMOS Image Sensors", Imaging Products Operations, pp. 1-2, Jan. 4, 1998.

JP Application # 2015-533077 Office Action dated Apr. 10, 2017.

\* cited by examiner

FIXED PATTERN NOISE REDUCTION

FIELD OF THE INVENTION

The present invention relates generally to imaging, and specifically to reduction of fixed pattern noise in an image.

BACKGROUND OF THE INVENTION

Fixed pattern noise (FPN), from arrays of sensor elements, is easily apparent to a human observer of an image due to the observer's inherent sensitivity to edges in the image. Consequently, any system which reduces the FPN in an image presented to an observer would be advantageous.

SUMMARY OF THE INVENTION

An embodiment of the present invention provides a method, including:

receiving signals, from a rectangular array of sensor elements arranged in rows and columns, corresponding to an image captured by the array;

analyzing the signals along a row or a column to identify one or more local turning points;

processing the signals at the identified local turning points to recognize fixed pattern noise in the captured image; and correcting values of the signals from the sensor elements at the identified local turning points so as to reduce the fixed pattern noise in the image.

In a disclosed embodiment the one or more local turning points include one or more local minima. Processing the signals to recognize the fixed pattern noise may include determining that an absolute value of differences of the signals at the one or more local minima is less than a predetermined threshold. The predetermined threshold may be a function of a noise level of the sensor elements, and correcting the values of the signals may consist of adding the noise level to the signals at the one or more local minima.

In an alternative disclosed embodiment the one or more local turning points include one or more local maxima. Processing the signals to recognize the fixed pattern noise may include determining that an absolute value of differences of the signals at the one or more local maxima is less than a predetermined threshold. The predetermined threshold may be a function of a noise level of the sensor elements, and correcting the values of the signals may include subtracting the noise level from the signals at the one or more local maxima.

In an alternative embodiment analyzing the signals along the row or the column includes evaluating the signals of a given sensor element and of nearest neighbor sensor elements of the given sensor element along the row or the column. The nearest neighbor sensor elements may include a first sensor element and a second sensor element, and the first sensor element, the given sensor element, and the second sensor element may be contiguous. Alternatively, the nearest neighbor sensor elements include a first plurality of sensor elements and a second plurality of sensor elements, the first and the second pluralities may be disjoint, and the given sensor element may lie between the first and the second pluralities.

In a further alternative embodiment the sensor elements along the row or the column include first elements configured to detect a first color and second elements configured to detect a second color different from the first color, and analyzing the signals along the row or the column may include analyzing the signals from the first elements to identify the one or more local turning points.

There is further provided, according to an embodiment of the present invention, a method, including:

receiving signals, from a rectangular array of sensor elements arranged in rows and columns, corresponding to an image captured by the array;

identifying a first row and a second row contiguous with the first row; and prior to receiving second row signals from the second row:

receiving first row signals from the first row;

analyzing the first row signals along the first row to identify one or more first row local turning points;

processing the first row signals at the identified first row local turning points to recognize fixed pattern noise in the captured image; and correcting values of the first row signals from the sensor elements at the identified first row local turning points so as to reduce the fixed pattern noise in the image.

Typically, the one or more first row local turning points include one or more first row local minima.

Alternatively or additionally, the one or more first row local turning points include one or more first row local maxima.

There is further provided, according to an embodiment of the present invention, a method, including:

receiving signals, from a rectangular array of sensor elements arranged in rows and columns, corresponding to an image captured by the array;

analyzing the signals along a diagonal of the array to identify one or more local turning points;

processing the signals at the identified local turning points to recognize fixed pattern noise in the captured image; and correcting values of the signals from the sensor elements at the identified local turning points so as to reduce the fixed pattern noise in the image.

There is further provided, according to an embodiment of the present invention, apparatus, including:

a rectangular array of sensor elements arranged in rows and columns, configured to output signals corresponding to an image captured by the array; and a processor which is configured to:

analyze the signals along a row or a column to identify one or more local turning points, process the signals at the identified local turning points to recognize fixed pattern noise in the captured image, and correct values of the signals from the sensor elements at the identified local turning points so as to reduce the fixed pattern noise in the image.

There is further provided, according to an embodiment of the present invention, apparatus, including:

a rectangular array of sensor elements arranged in rows and columns, configured to output signals corresponding to an image captured by the array; and a processor which is configured to:

identify a first row and a second row contiguous with the first row, and prior to receiving second row signals from the second row:

receive first row signals from the first row, analyze the first row signals along the first row to identify one or more first row local turning points, process the first row signals at the identified first row local turning points to recognize fixed pattern noise in the captured image, and correct values of the first row signals from the sensor elements at the identified first row local turning points so as to reduce the fixed pattern noise in the image.

There is further provided, according to an embodiment of the present invention, apparatus, including:

a rectangular array of sensor elements arranged in rows and columns, configured to output signals corresponding to an image captured by the array; and a processor which is configured to:

analyze the signals along a diagonal of the array to identify one or more local turning points, process the signals at the identified local turning points to recognize fixed pattern noise in the captured image, and correct values of the signals from the sensor elements at the identified local turning points so as to reduce the fixed pattern noise in the image.

The present invention will be more fully understood from the following detailed description of the embodiments thereof, taken together with the drawings in which:

DETAILED DESCRIPTION OF EMBODIMENTS

Overview

In an embodiment of the present invention, the presence of fixed pattern noise, generated by sensor elements in a rectangular array, is compensated for. The elements are arranged in rows and columns, and capture an image from light incident on the array. The elements in turn generate respective signals corresponding to the image captured by the array.

The element signals are analyzed, along a row, along a column, or along any other linear line, to identify elements wherein the signals form one or more local turning points, i.e., one or more local maxima or one or more local minima. The signals from the identified elements are processed, typically by measuring an amplitude of the local turning point, to recognize that the signals do correspond to fixed pattern noise.

For elements that are identified as producing fixed pattern noise, the values of the signals from the elements are corrected in order to reduce the fixed pattern noise in the image. The correction is typically accomplished by adding a noise level (of noise generated by the elements of the array) to an identified local minimum, or by subtracting a noise level from an identified local maximum.

The compensation for the presence of fixed pattern noise may be performed for both "gray-scale" and color arrays. The compensation is designed to suit real time implementation with moderate computational/hardware demands, and needs no prior off-line or on-line calibration of the array of elements.

DETAILED DESCRIPTION

Figure 1:
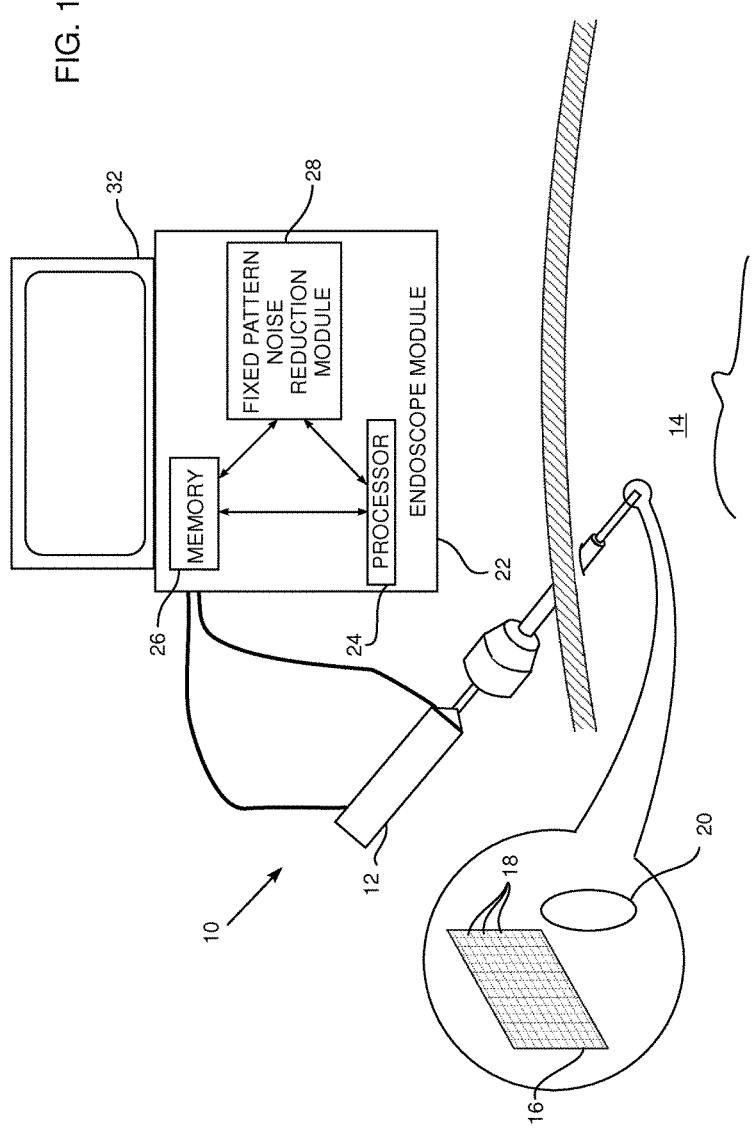
FIG. 1 is a schematic illustration of a fixed pattern noise reduction system, according to an embodiment of the present invention.

Reference is now made to FIG. 1, which is a schematic illustration of a fixed pattern noise reduction system 10, according to an embodiment of the present invention. System 10 may be applied to any imaging system wherein images are generated using a rectangular array of sensor elements, herein by way of example assumed to comprise photo-detectors. Herein, by way of example, system 10 is assumed to be applied to images generated by an endoscope 12 which is imaging a body cavity 14 of a patient undergoing a medical procedure. To implement its imaging, endoscope 12 comprises a rectangular array 16 of substantially similar individual sensor elements 18, as well as a lens system 20 which focuses light onto the sensor elements. In the description herein, as required, sensor elements 18 are distinguished from each other by having a letter appended to the identifying numeral (so that array 16 can be considered as comprising sensor elements 18A, 18B, 18C, . . . . )

Although FIG. 1 illustrates array 16 and lens system 20 as being at the distal end of the endoscope, it will be understood that the array and/or the lens system may be at any convenient locations, including locations at the proximal end of the endoscope, and locations external to the endoscope. Except where otherwise indicated in the following description, for simplicity and by way of example, the individual sensor elements of the array are assumed to comprise "gray-scale" sensor elements generating output levels according to the intensity of incident light, and regardless of the color of the incident light. Typically, array 16 comprises a charge coupled device (CCD) array of sensor elements 18. However, array 16 may comprise any other type of sensor elements known in the art, such as complementary metal oxide semiconductor (CMOS) detectors or hybrid CCD/CMOS detectors.

Array 16 operates in a periodic manner, so that within a given period it outputs voltage levels of its sensor elements as a set of values. In the description herein a set of values output for one period of operation of the array is termed a frame. Array 16 may operate at a standard frame rate, such as 60 frames/second (where the period of operation is 1/60 s). Alternatively, array 16 may operate at any other frame rate, which may be higher or lower than a standard rate of 60 frames/second.

System 10 is supplied with the video signal of an endoscope module 22, comprising a processor 24 communicating with a memory 26. Endoscope module 22 also comprises a fixed pattern noise (FPN) reduction module 28, which may be implemented in software, hardware, or a combination of software and hardware. The functions of endoscope module 22 and FPN reduction module 28 are described below. While for simplicity and clarity FPN module 28 and processor 24 have been illustrated as being separate from endoscope 12, this is not a requirement for embodiments of the present invention. Thus, in one embodiment FPN module 28 and the functionality used by processor 24 (for operation of the FPN module) are incorporated into a handle of the endoscope. Such an embodiment may operate as a stand-alone system, substantially independent of the endoscope module.

Processor 24 uses software stored in memory 26, as well as FPN module 28, to operate system 10. Results of the operations performed by processor 24 may be presented to a medical professional operating system 10 on a screen 32, which typically displays an image of body cavity 14 undergoing the procedure. The software used by processor 24 may be downloaded to the processor in electronic form, over a network, for example, or it may, alternatively or additionally, be provided and/or stored on non-transitory tangible media, such as magnetic, optical, or electronic memory.

Figure 2:
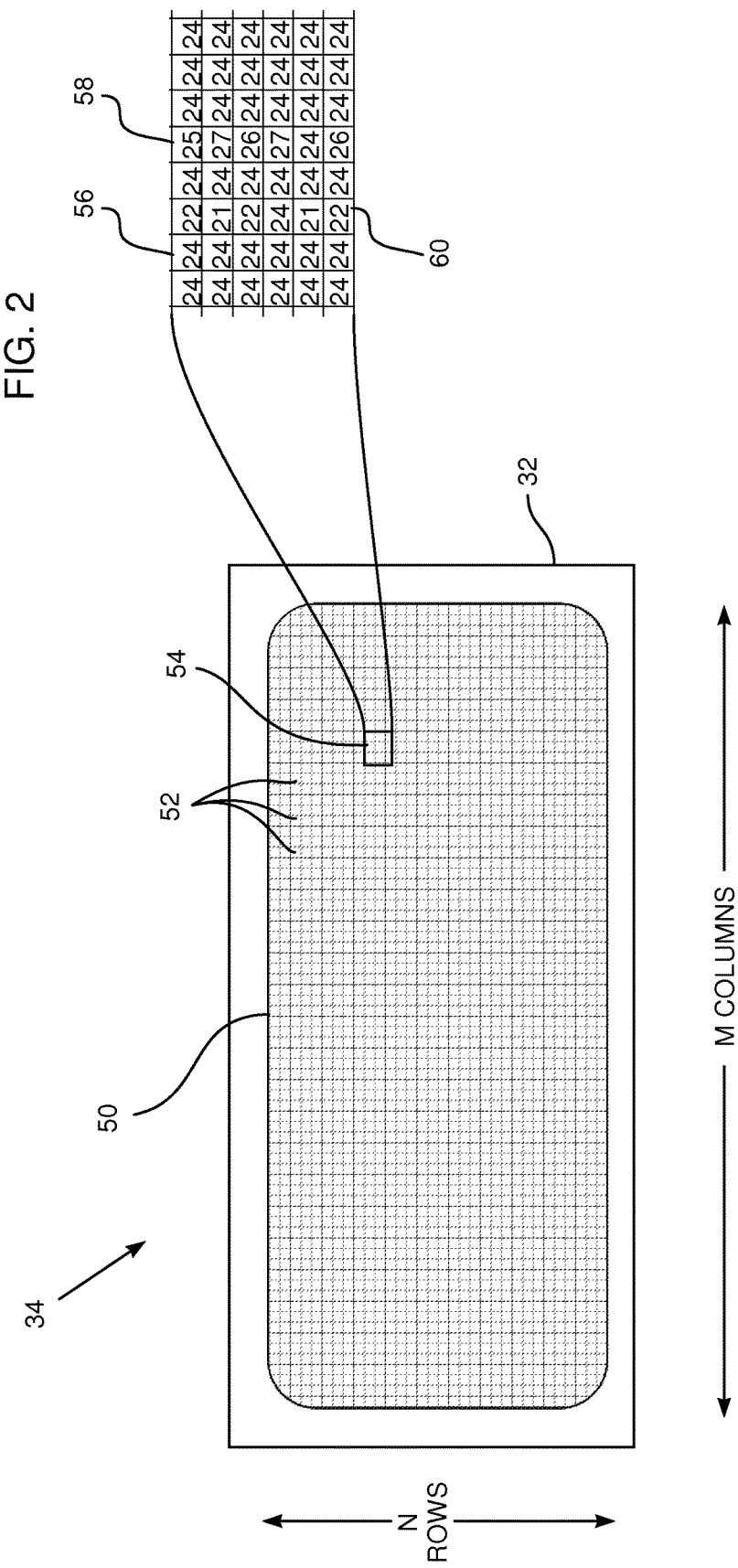
FIG. 2 is a schematic illustration of a first display generated on a screen, according to an embodiment of the present invention.

FIG. 2 is a schematic illustration of a first display 34 generated on screen 32, according to an embodiment of the present invention. Display 34 is produced by processor 24, from a single frame output by array 16, as a rectangular array 50 of pixels 52, and the pixels are distinguished as necessary by appending a letter to the identifying numeral. Array 50 and array 16 have a one-to-one correspondence, so that each pixel 52A, 52B, 52C, . . . has a level, or value, representative of an intensity of light registered by a corresponding sensor element 18A, 18B, 18C, . . . . Except where otherwise indicated, pixels 52 are assumed by way of example to have 256 gray levels, varying in value from 0 (black) to 255 (white). In the following description, the arrays are assumed to have N rows×M columns, where N, M are positive integers. Typically, although not necessarily, N, M are industry standard values, and (N,M) may equal, for example, (1080, 1920).

Theoretically, if array 16 is illuminated with light that has a constant intensity over the array, the level of each pixel 52 in array 50 is equal. Thus, if array 16 is illuminated with low-intensity light that has an equal intensity over the whole array, the pixel value of each pixel 52 should be the same, and in FIG. 2 the value is assumed to have a value 24. In fact, random noise causes a random variation in the pixel value, but for simplicity and for the purposes of description such random noise is disregarded.

A region 54 of array 50 is shown in more detail in a callout 56, and exemplary levels of the pixels are provided in the callout. As illustrated in the callout, the levels of most of the pixels are 24. However, two columns differ from 24: a column 58 has pixel values which are generally larger than 24, a column 60 has pixel values which are generally smaller than 24. The differences from the expected value of 24 are typically because of practical limitations such as small differences in the individual response and/or construction of sensor elements 18, and/or differences in amplification stages after the sensor elements. The differences from the expected value appear on screen 32 as a lighter or darker pixel compared to the surrounding pixels, and because of the characteristics of the human visual system, spatially coherent differences along a curve are particularly evident. (In CCD/CMOS sensors such a common curve is a row or a column, such as column 58 or 60.) The differences, termed fixed pattern noise, are corrected by system 10.

Figure 3:
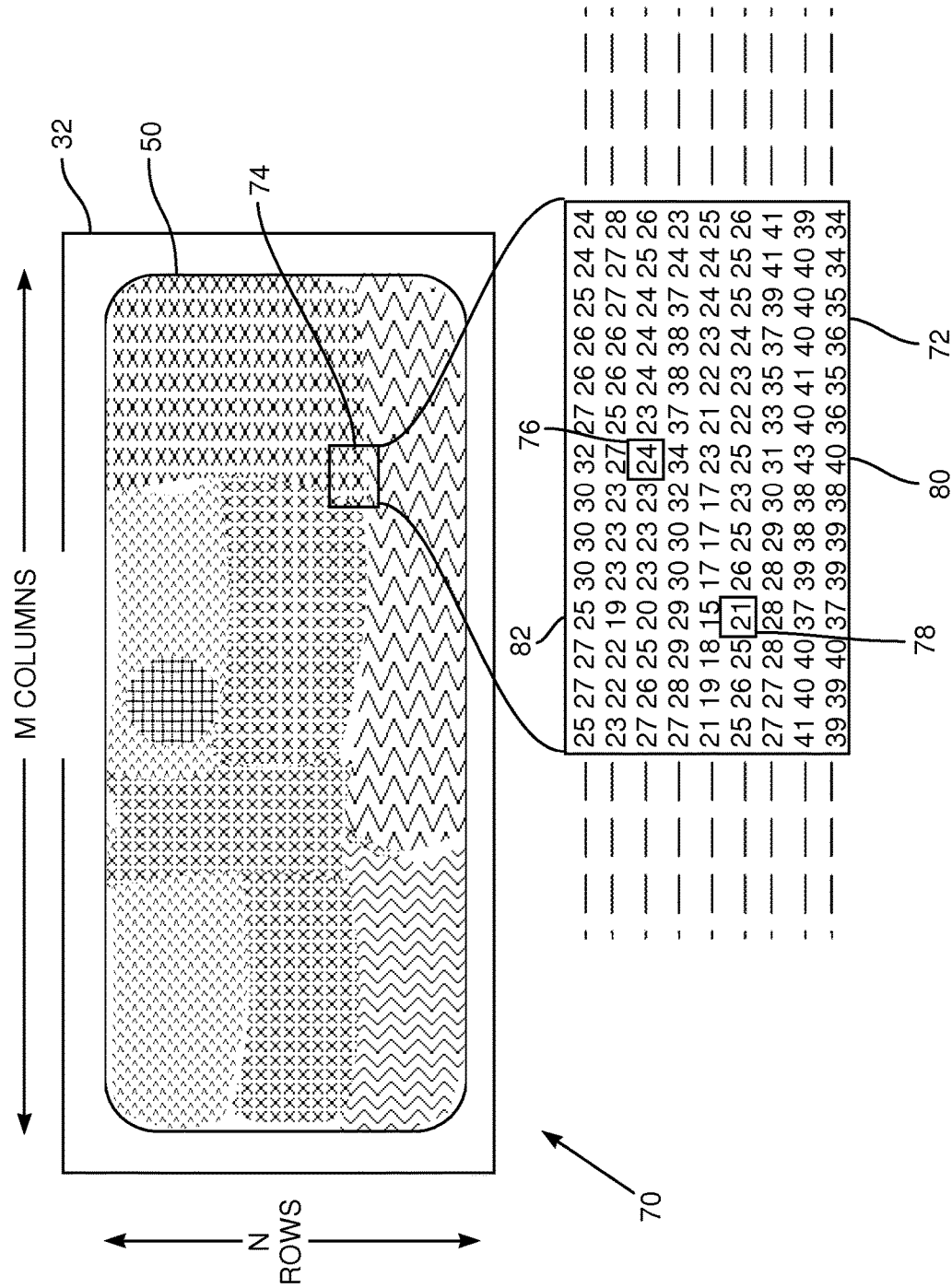
FIG. 3 is a schematic illustration of a second display generated on the screen, according to an embodiment of the present invention.

FIG. 3 is a schematic illustration of a second display 70 generated on screen 32, according to an embodiment of the present invention. Display 70 is produced from a single frame of array 16, and has varying gray levels, such as occur in an image of cavity 14. A callout 72 gives levels of pixels 52 that processor generates from sensor elements 16 for a region 74 of the display, showing numerical values of the varying gray levels. The broken lines beside callout 72 represent the existence of pixels (whose values are not shown) on either side of the callout. Overall there are N rows×M columns of pixels; the significance of pixels 76 and 78, and of columns 80 and 82, is explained below.

Figure 4:
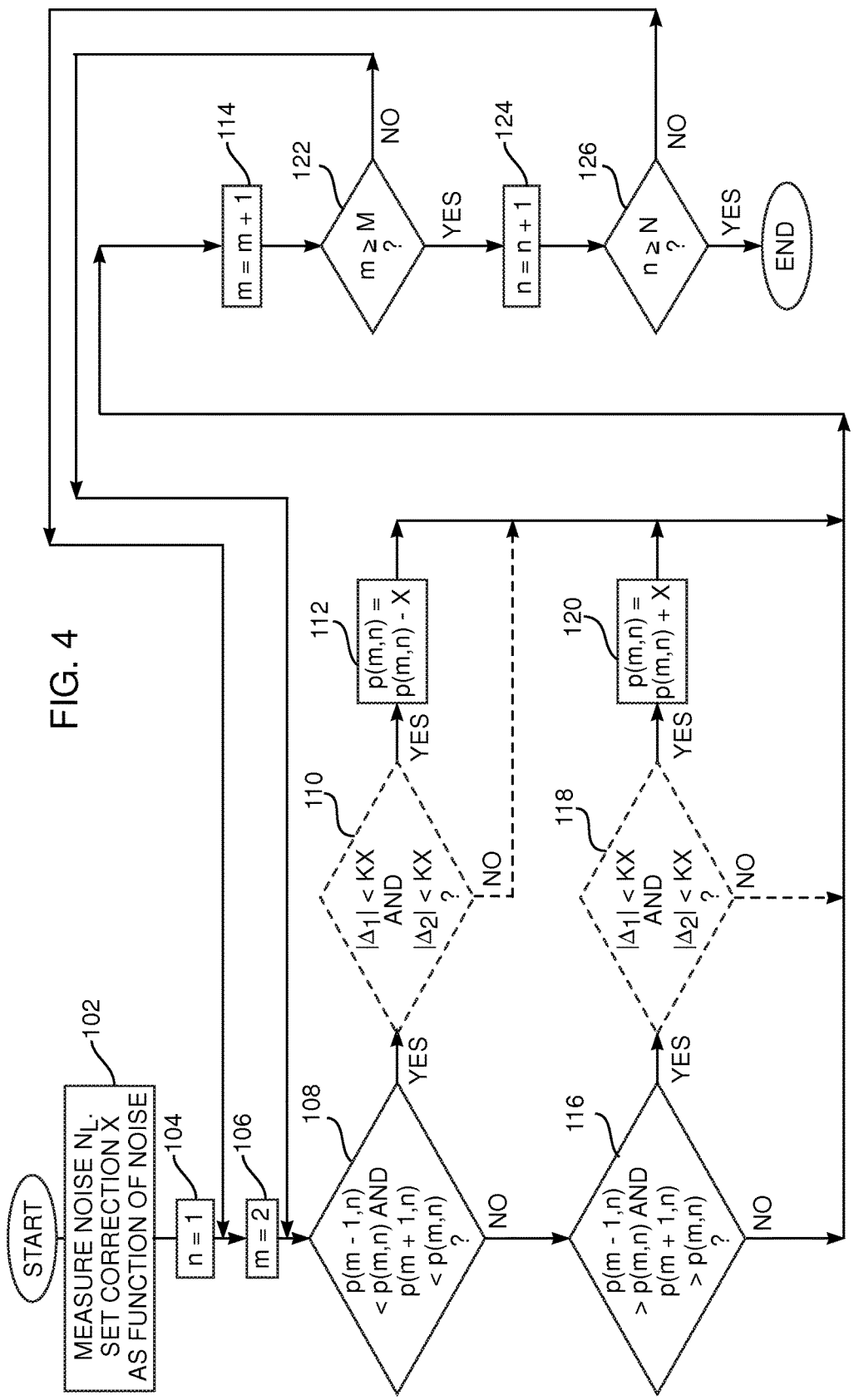
FIG. 4 is a flowchart of steps performed by a processor in checking for fixed pattern noise, and in correcting for the noise when found, according to an embodiment of the present invention.

FIG. 4 is a flowchart of steps performed by processor 24 in checking for fixed pattern noise, and in correcting for the noise when found, according to an embodiment of the present invention. The processor performs the steps on each frame of pixel values received from array 16, prior to displaying the values, corrected as required by the flowchart, on screen 32. The steps of the flowchart are typically performed sequentially on sets of pixel values as the sets are received by the processor, so that any correction needed in the value of a pixel in a given set may be made before subsequent pixel sets are received. Alternatively, the steps may be performed after receipt by the processor of a complete frame, and prior to receipt of an immediately following frame. In either case, any corrections generated by the flowchart may be performed in real time.

It will be understood that while the flowchart may generate a corrected value for a particular pixel, the corrected value is only used in generating the display on screen 32. Any corrected pixel value is not used in subsequent iterations of the flowchart.

In the flowchart description, $0 \leq m \leq M$, $m \in I$; $0 \leq n \leq N$, $n \in I$, and M, N are as defined above. The values m, n define a pixel (m, n), and in the flowchart m, n are also used as counters. Pixel (m, n) has a pixel value p(m,n).

In an initial step 102, the processor measures a noise level $N_L$ generated by array 16. The noise level used may comprise any convenient noise level known in the art, such as a root mean square level or an average level. Typically, although not necessarily, the noise level may be measured prior to array 16 being used for imaging in system 10, for example, at a facility manufacturing the array. In some embodiments an operator of system 10 may provide a value of noise level $N_L$ to the processor without the processor having to make an actual measurement.

From the noise level, the processor sets a correction factor X to be applied in subsequent steps of the flowchart, where X is a function of $N_L$. In some embodiments, X is set equal to $N_L$.

In a row defining step 104 the processor sets n equal to 1, to analyze the first row of the frame. In a column defining step 106 the processor sets m equal to 2, to analyze the second pixel in the row. (As is explained further below, the processor considers sets of three pixels, and analyzes the central pixel of the set. Thus, the first pixel analyzed is the second pixel of the row.)

In a first local turning point condition 108, the processor checks if the values of the pixels immediately preceding and immediately following the pixel being analyzed are both less than the value, p(m,n), of the pixel being analyzed. The condition checks if the pixel being analyzed, i.e., the pixel at the center of the three pixels of the set being considered, is at a local turning point, in this case a local maximum.

If condition 108 provides a valid return, then in an optional condition step 110 the processor checks if absolute values of differences $\Delta_1$ and $\Delta_2$ are less than a predefined multiple K of correction factor X. The term KX acts as a threshold value. In step 110, $$\Delta_1 = p(m-1,n) - p(m,n)$$

$$\Delta_2 = p(m+1,n) - p(m,n) \quad (1)$$

The condition checked by the processor in step 110 is:

$$|\Delta_1| < KX \text{ AND } |\Delta_2| < KX \quad (2)$$

Typically K>2. In one exemplary embodiment K=4.

Step 110 may be applied to prevent system 10 from deforming image edges, such as may occur if the amplitude of the detected turning point is large. In the case that it is applied, a suitable value of K may be determined by an operator of system 10, and/or by a manufacturer of array 16, without undue experimentation. Typically, lower values of K result in better edge preservation at the cost of less noise removal, and higher K values result in better noise removal, but with a greater chance of modifying weak edges.

If condition 110 holds, then in a first adjustment step 112 the value p(m,n) is reduced by X and the flowchart then continues at a pixel increment step 114. If condition 110 doesn't hold, the flowchart proceeds directly to step 114. If step 110 is not applied, a valid return to condition 108 leads directly to first adjustment step 112.

If first turning point condition 108 doesn't hold, the flowchart continues at a second local turning point condition 116.

In second turning point condition 116, the processor checks the set of pixels already checked in condition 108. In condition 116 the processor checks if the pixel being analyzed, i.e., central pixel p(m,n) in the set of pixels {p(m−1, n), p(m,n), p(m+1,n)}, is at a local minimum. If condition 116 holds, then the processor may apply an optional condition step 118, which is substantially the same as optional condition step 110 described above, and performs the same function. Typically, although not necessarily, in embodiments where step 110 is applied step 118 is also applied.

If condition 118 holds, then in a second adjustment step 120 the value p(m,n) is increased by X and the flowchart continues at pixel increment step 114. If condition 118 doesn't hold, the flowchart proceeds to step 114. If step 118 is not applied, a valid return to condition 116 leads directly to second adjustment step 120.

In a row checking condition 122, the processor checks if an end of a row being checked has been reached. If the end has not been reached, then the flowchart returns to condition 108, and initiates analysis of a subsequent pixel in the row.

If condition 122 provides a valid return, indicating that the end of a row has been reached, the processor increments row counter n by one in an increment row step 124. The processor then checks, in a last row condition 126, if the last row of array 16 has been reached. If the last row has not been reached, the flowchart returns to step 106, to begin analyzing a subsequent row of array 16.

If condition 126 provides a valid return, so that all rows of array 16 have been analyzed, the flowchart ends.

Referring back to FIG. 3, it will be understood that application of the flowchart to the pixels of callout 72 determines that pixel 76 is a local maximum, so that the processor decreases its value by X prior to displaying the pixel on screen 32. Similarly, application of the flowchart to the other pixels of column 80 determines that most of the other pixels of the column are at local maxima, and have their value decreased by X. From callout 72 pixel 78 is a local minimum, so that the processor increases its value by X prior to display on screen 32. Similarly, most of the other pixels of column 82 are at local minima, and those that are at local minima have their value increased by X.

Consideration of the flowchart illustrates that in performing the steps of the flowchart processor 24 checks sequential sets of three contiguous pixels. In each set the processor checks if the central pixel is at a local turning point, i.e., is at a local maximum, wherein condition 108 is valid, or is at a local minimum, wherein condition 116 is valid. If the central pixel is at a local maximum, its value is increased; if the central pixel is at a local minimum, its value is decreased.

As is apparent from the flowchart description, and unlike prior art methods for reducing FPN, there is no need for calibration of array 16 prior to implementation of the steps of the flowchart.

Figure 5:
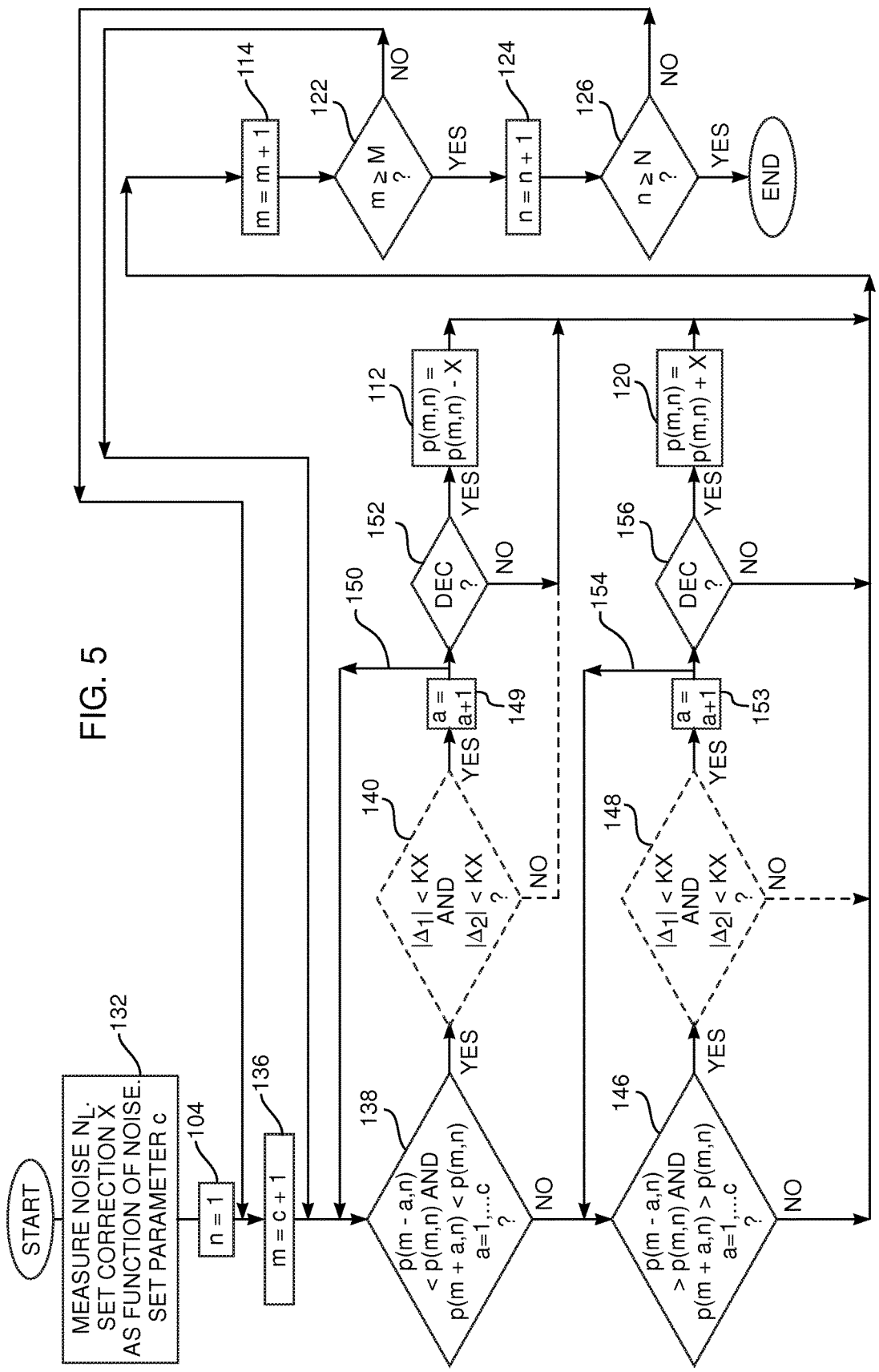
FIG. 5 is a flowchart of steps performed by the processor in checking for fixed pattern noise, and in correcting for the noise when found, according to an alternative embodiment of the present invention.

FIG. 5 is a flowchart of steps performed by processor 24 in checking for fixed pattern noise, and in correcting for the noise when found, according to an alternative embodiment of the present invention. Apart from the differences described below, the steps of the flowchart of FIG. 5 are generally similar to that of the steps of the flowchart of FIG. 4, and steps indicated by the same reference numerals in both flowcharts are generally similar when implemented.

In contrast to the flowchart of FIG. 4 (wherein the processor analyzed the central pixel in a set of three contiguous pixels), in the flowchart of FIG. 5 processor 24 analyzes the central pixel in a set of more than three contiguous pixels, typically an odd number of pixels, to identify central pixels that are local turning points.

A first step 132 includes the actions of step 102. In addition, in step 132 a value of a whole number c is selected. The value of c defines the number of pixels S in the sets analyzed by the processor, according to the equation:

$$S=2c+1 \quad (3)$$

In the following description whole number c, by way of example is assumed to be 4, so that S=9, i.e., processor 24 considers sets of nine pixels.

In a column defining step 136 the processor sets m equal to c+1, to analyze the central pixel in the first set of nine pixels. In this example, m=5, so the processor begins by analyzing the fifth pixel in the row being considered.

A first local turning point condition 138 includes the action of condition 108, described above, where the central pixel is compared with its nearest neighbors to determine if the central pixel is at a local turning point, in this case a local maximum.

In addition, assuming the nearest-neighbor comparison is valid, in condition 138 the processor also compares, iteratively, the central pixel with its next-nearest neighbors and succeeding next-nearest neighbors. The iteration is illustrated in the flowchart by an increment step 149, where the value of "a", defined below in expression (4), increments, and a line 150. For a set of nine pixels, in addition to the nearest neighbors, there are next-nearest neighbors, next-next-nearest neighbors, and next-next-next-nearest neighbors, so that there are three iterations. If a comparison is valid, the processor assigns a turning point parameter $G_a$ to be 1. If the comparison is invalid, $G_a$ is assigned to be 0.

An expression for condition 138 is:

$$G_a = \begin{cases} 1 \text{ if } p(m-a,n) < p(m,n) > p(m+a,n) \\ 0 \text{ otherwise} \\ a = 1, 2, \ldots, c \end{cases} \quad (4)$$

An optional condition step 140 is generally similar to step 110, and may be applied to each iteration of condition 138 to check that absolute values of differences $\Delta_1$ and $\Delta_2$ are less than the predefined value K (described above). In condition step 140, $$\Delta_1 = p(m-a,n) - p(m,n),$$

$$\Delta_2 = p(m+a,n) - p(m,n)$$

$$a=1, 2, \ldots, c \quad (5)$$

In a decision 152, the processor evaluates all the values of $G_a$ determined in condition 138, assuming they have been validated in step 140. If the evaluation is valid, then the flowchart proceeds to step 112 where the value X is subtracted from p(m,n). If the evaluation is invalid, p(m,n) is unchanged, and the flowchart continues at step 114.

In general, in decision 152 there are c values of turning point parameter $G_a$, each of the values being 0 or 1. In a first embodiment, if 50% or more of the values are 1, then the evaluation in decision 152 is returned valid. In a second embodiment, if 75% or more of the values are 1, then the decision is valid. In other embodiments, the condition for decision 152 to be valid is another, preset, fraction of unit values. In some embodiments, weighting may be attached to the different values of $G_a$, for example, a weight for $G_1$ (the nearest neighbor value of the turning point parameter) may be assigned a higher weight than a weight for $G_2$ (the next-nearest neighbor value of the turning point parameter).

If the nearest-neighbor comparison in condition 138 is invalid, then the flowchart continues to a second local turning point condition 146. Condition 146 includes the action of condition 116, where by comparing with its nearest neighbors the processor determines if the central pixel is at a local minimum.

In addition, assuming the nearest-neighbor comparison in condition 146 is valid, the processor performs an iterative process on succeeding next-nearest neighbors of the central pixel. The iterative process is substantially as described above for condition 138, and is illustrated in the flowchart by a line 154 and an increment step 153, generally similar to step 149 described above. In condition 146, the processor evaluates values of turning point parameter $G_a$ according to expression (6):

$$G_a = \begin{cases} 1 \text{ if } p(m-a, n) > p(m, n) < p(m+a, n) \\ 0 \text{ otherwise} \\ a = 1, 2, \ldots, c \end{cases} \quad (6)$$

An optional condition step 148 is substantially the same as step 140, described above.

A decision 156 is substantially the same as decision 152, described above. Thus, in decision 156 the processor evaluates all the values of $G_a$ determined in condition 146, assuming they have been validated in step 148. If the evaluation is valid, then the flowchart proceeds to step 120 where the value X is added to p(m,n). If the evaluation is invalid, p(m,n) is unchanged, and the flowchart continues at step 114.

Referring back to FIG. 3, and assuming that c is set equal to 4, application of the flowchart of FIG. 5 to pixel 76 gives $G_1=1$, $G_2=0$, $G_3=0$, and $G_4=0$. Consequently, for either the first or second embodiment referred to above, no adjustment is made to the value of pixel 76. In the case of pixel 78, $G_1=1$, $G_2=1$, $G_3=1$, and $G_4=1$. Thus for either the first or second embodiment referred to above, X is added to the value of pixel 78.

Consideration of the flowchart of FIG. 5 shows that signals from central array element are compared with signals from pluralities of elements on either side of the central element. All the elements in the comparison are contiguous, and the two pluralities are disjoint.

The description above has assumed that analysis of pixel values derived from array 16 is on a row by row basis. Such an analysis could be performed as a given row data is available to the processor, and the processor is typically able to perform its analysis before data from the row immediately following the given row is available to the processor. Alternatively, the analysis on a row by row basis may be made by the processor when a complete frame of data is available to the processor. In this case the analysis is typically completed before an immediately succeeding frame of data is available to the processor.

In cases where complete frames of data are available to the processor, a first alternative embodiment of the present invention comprises analyzing the frame data on a column by column basis. As with the analysis on a row by row basis, all columns may be analyzed before an immediately succeeding frame is available to the processor. Those having ordinary skill in the art will be able to adapt the description of the flowcharts of FIGS. 4 and 5, mutatis mutandis, for analysis of pixel values on a column by column basis.

In addition, in a second alternative embodiment that may be implemented for cases where complete frames of data are available, the data may be analyzed on a diagonal by diagonal basis. Such an embodiment is not limited to "simple" diagonals, where elements lie on diagonals having a slope of +1 so that succeeding elements are generated on a "one across and one up" basis, or a slope of −1, so that succeeding elements are generated on a "one across and one down" basis. Rather, embodiments of the present invention comprise analysis on a diagonal by diagonal basis, where a diagonal is any straight line having an equation of the form:

$$y = ax + b \quad (7)$$

where "a" and "b" are real numbers, "a" is the slope of the diagonal, and x, y, represent variables on respective orthogonal axes.

It will be understood that for any given value of slope "a" sequential values of "b" in equation (7) define a family of parallel diagonals that may be used for the diagonal by diagonal basis referred to above. Those having ordinary skill in the art will be able to adapt the description of the flowcharts above for analysis of pixel values on such a diagonal by diagonal basis.

It will be understood that regardless of the different types of analysis described above, all analyses may be accomplished in real time.

For simplicity, the description above has assumed that the sensor elements of array 16 generate gray scale values according to the intensity of light incident on the elements, independent of the color of the light. Embodiments of the present invention comprise arrays which have elements that are dependent on the color of the incident light. Such elements, herein referred to as "color elements," typically have a color filter in front of the elements, and may, for example, be arranged in a Bayer configuration. In the case of an array having color elements, the analysis described above is on sub-arrays of color elements having the same color. Thus, for an RGB (red, green, blue) array, the analysis is performed on a red sub-array of elements, a green sub-array of elements, and a blue sub-array of elements.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. A method, comprising:
receiving signals, from a rectangular array of sensor elements arranged in rows and columns, corresponding to an image captured by the array;
analyzing the signals along a row or a column to identify one or more local turning points within the row or the column;
processing the signals at the identified local turning points to determine whether the signals at the local turning point meet a given condition;
calculating corrected values of the signals corresponding to the image captured by the array of sensor elements at the identified local turning points, by adding to the identified turning points meeting the given condition, a predetermined value which reduces the amplitude if the turning point is a maximum and which increases the amplitude if the turning point is a minimum, so as to reduce the fixed pattern noise in the image; and
displaying the captured image with the calculated corrected values.

2. The method according to claim 1, wherein the one or more local turning points comprise one or more local minima.

3. The method according to claim 2, wherein processing the signals to determine whether an amplitude of the signals at the local turning point meets a given condition comprises determining that an absolute value of differences between the signals at the one or more local minima and neighboring signals is less than a predetermined threshold.

4. The method according to claim 3, wherein the predetermined threshold is a function of a noise level of the sensor elements, and wherein adding the predetermined value comprises adding the noise level to the signals at the one or more local minima.

5. The method according to claim 1, wherein the one or more local turning points comprise one or more local maxima.

6. The method according to claim 5, wherein processing the signals to determine whether an amplitude of the signals at the local turning point meets a given condition comprises determining that an absolute value of differences between the signals at the one or more local maxima and neighboring signals is less than a predetermined threshold.

7. The method according to claim 6, wherein the predetermined threshold is a function of a noise level of the sensor elements, and wherein adding the predetermined value comprises subtracting the noise level from the signals at the one or more local maxima.

8. The method according to claim 1, wherein analyzing the signals along the row or the column comprises evaluating the signals of a given sensor element and of nearest neighbor sensor elements of the given sensor element along the row or the column.

9. The method according to claim 8, wherein the nearest neighbor sensor elements comprise a first sensor element and a second sensor element, and wherein the first sensor element, the given sensor element, and the second sensor element are contiguous.

10. The method according to claim 8, wherein the nearest neighbor sensor elements comprise a first plurality of sensor elements and a second plurality of sensor elements, wherein the first and the second pluralities are disjoint, and wherein the given sensor element lies between the first and the second pluralities.

11. The method according to claim 1, wherein the sensor elements along the row or the column comprise first elements configured to detect a first color and second elements configured to detect a second color different from the first color, and wherein analyzing the signals along the row or the column comprises analyzing the signals from the first elements to identify the one or more local turning points.

12. A method, comprising:
receiving signals, from a rectangular array of sensor elements arranged in rows and columns, corresponding to an image captured by the array;
identifying a first row and a second row contiguous with the first row;
prior to receiving second row signals from the second row:
  receiving first row signals from the first row;
  analyzing the first row signals along the first row to identify one or more first row local turning points within the row;
  processing the first row signals at the identified first row local turning points to determine whether the signals at the first row local turning points meet a given condition;
  calculating corrected values of the first row signals of the image captured by the array of sensor elements at the identified first row local turning points, by adding to the identified first row local turning points meeting the given condition, a predetermined value which reduces the amplitude if the turning point is a maximum and which increases the amplitude if the turning point is a minimum, so as to reduce the fixed pattern noise in the image; and
  displaying an image based on the received signals with the corrected values.

13. The method according to claim 12, wherein the one or more first row local turning points comprise one or more first row local minima.

14. The method according to claim 12, wherein the one or more first row local turning points comprise one or more first row local maxima.

15. A method, comprising:
receiving signals, from a rectangular array of sensor elements arranged in rows and columns, corresponding to an image captured by the array;
analyzing the signals along a diagonal of the array to identify one or more local turning points within the diagonal;
processing the signals at the identified local turning points to determine whether the signals at the local turning points meet a given condition;
correcting values of the signals of the image captured by the array of sensor elements at the identified local turning points, by adding to the identified turning points meeting the given condition, a predetermined value which reduces the amplitude if the turning point is a maximum and which increases the amplitude if the turning point is a minimum, so as to reduce the fixed pattern noise in the image; and
displaying the captured image with the corrected values.

16. Apparatus, comprising:
a rectangular array of sensor elements arranged in rows and columns, configured to output signals corresponding to an image captured by the array; and
a processor which is configured to:
  analyze the signals along a row or a column to identify one or more local turning points within the row or the column, process the signals at the identified local turning points to determine whether the signals at the local turning point meet a given condition, calculate corrected values of the signals of the image captured by the array of sensor elements at the identified local turning points, by adding to the identified turning points meeting the given condition, a predetermined value which reduces the amplitude if the turning point is a maximum and which increases the amplitude if the turning point is a minimum, so as to reduce the fixed pattern noise in the image, and display the captured image with the calculated corrected values.

17. Apparatus, comprising:

a rectangular array of sensor elements arranged in rows and columns, configured to output signals corresponding to an image captured by the array; and a processor which is configured to:

identify a first row and a second row contiguous with the first row, and prior to receiving second row signals from the second row:

receive first row signals from the first row, analyze the first row signals along the first row to identify one or more first row local turning points within the first row, process the first row signals at the identified first row local turning points to determine whether the signals at the local turning point meet a given condition, calculate corrected values of the first row signals of the image captured by the array of sensor elements at the identified first row local turning points, by adding to the identified turning points meeting the given condition, a predetermined value which reduces the amplitude if the turning point is a maximum and which increases the amplitude if the turning point is a minimum, so as to reduce the fixed pattern noise in the image, and display the captured image with the calculated corrected values.

18. Apparatus, comprising:

a rectangular array of sensor elements arranged in rows and columns, configured to output signals corresponding to an image captured by the array; and a processor which is configured to:

analyze the signals along a diagonal of the array to identify one or more local turning points within the diagonal, process the signals at the identified local turning points to determine whether the signals at the local turning point meet a given condition, calculate corrected values of the signals of the image captured by the array of sensor elements at the identified local turning points, by adding to the identified turning points meeting the given condition, a predetermined value which reduces the amplitude if the turning point is a maximum and which increases the amplitude if the turning point is a minimum, so as to reduce the fixed pattern noise in the image, and display the captured image with the calculated corrected values.

19. The apparatus of claim 16, wherein the processor is configured to correct values of the signals by a noise level of the sensor elements, determined before the sensor elements are used.

20. The apparatus of claim 16, wherein the processor is configured to correct values of signals at identified local turning points, only if the difference between the value at the local turning point and neighboring points is smaller than a threshold value.

21. The method according to claim 1, wherein adding the predetermined value comprises adding an average noise level of the array of sensor elements.

* * * * *